United States Patent
Schiffer et al.

(10) Patent No.: US 10,105,887 B2
(45) Date of Patent: Oct. 23, 2018

(54) PLASTICIZING UNIT OF AN INJECTION MOLDING MACHINE FOR MICRO-INJECTION MOLDING

(71) Applicant: Dr. Boy GmbH & Co. KG, Neustadt-Fernthal (DE)

(72) Inventors: Alfred Schiffer, Obersteinebach (DE); Martin Kaiser, Neuwied (DE)

(73) Assignee: Dr. Boy GmbH & Co., KG, Neustadt-Fernthal (DE)

( * ) Notice: Subject to any disclaimer, the term of this patent is extended or adjusted under 35 U.S.C. 154(b) by 295 days.

(21) Appl. No.: 15/178,647

(22) Filed: Jun. 10, 2016

(65) Prior Publication Data
US 2017/0087756 A1     Mar. 30, 2017

(30) Foreign Application Priority Data
Sep. 30, 2015  (DE) .......... 10 2015 116 625

(51) Int. Cl.
  *B29C 45/52*  (2006.01)
  *B29C 45/62*  (2006.01)
  *B29C 45/47*  (2006.01)

(52) U.S. Cl.
  CPC .............. *B29C 45/52* (2013.01); *B29C 45/62* (2013.01); *B29C 45/47* (2013.01); *B29K 2995/0094* (2013.01)

(58) Field of Classification Search
  CPC ......... B29C 45/52; B29C 45/62; B29C 45/47; B29K 2995/0094
  See application file for complete search history.

(56) References Cited

U.S. PATENT DOCUMENTS 3,163,693 A * 12/1964 Stenger ................... B29C 45/50
                                                            264/328.17
5,212,365 A *  5/1993 Wiederin ............... B23K 9/328
                                                            219/121.48

(Continued)

FOREIGN PATENT DOCUMENTS

DE         224809      7/1985
DE       19520904     2/1996

(Continued)

OTHER PUBLICATIONS

German Search Report dated Apr. 26, 2015 filed in 10 2015 116 625.9.

*Primary Examiner* — Nahida Sultana
(74) *Attorney, Agent, or Firm* — Rankin, Hill & Clark LLP

(57) ABSTRACT

A plasticizing unit of an injection molding machine for micro-injection molding includes a plasticizing cylinder and a screw, which conveys material to be plasticized from a feed opening in the direction of an outlet opening. At least one longitudinal section of the plasticizing cylinder between the feed opening and the outlet opening is formed as a transition region in which the inner diameter of the plasticizing cylinder tapers in the direction of the outlet opening to the outer diameter of the screw. The transition region is formed by a sleeve-shaped transition element which is removably and replaceably mounted within the plasticizing cylinder. The plasticizing cylinder is designed as at least two parts for removing and replacing the sleeve-shaped transition element.

13 Claims, 3 Drawing Sheets

(56) References Cited

U.S. PATENT DOCUMENTS

| | | | |
|---|---|---|---|
| 5,811,136 A * | 9/1998 | Morita | B29C 45/1773 425/190 |
| 6,835,058 B2 * | 12/2004 | Kaminski | B29C 45/50 425/145 |
| 2001/0008316 A1 * | 7/2001 | Teraoka | B29C 44/3446 264/50 |
| 2003/0168766 A1 * | 9/2003 | Teraoka | B29C 44/3446 264/50 |
| 2017/0099398 A1 * | 4/2017 | Sakayama | H04N 1/00103 |
| 2018/0072480 A1 * | 3/2018 | Genosar | A61J 1/2089 |

FOREIGN PATENT DOCUMENTS

| | | |
|---|---|---|
| DE | 19819808 | 5/1999 |
| DE | 10210464 | 9/2003 |
| DE | 102006004899 | 8/2007 |

\* cited by examiner

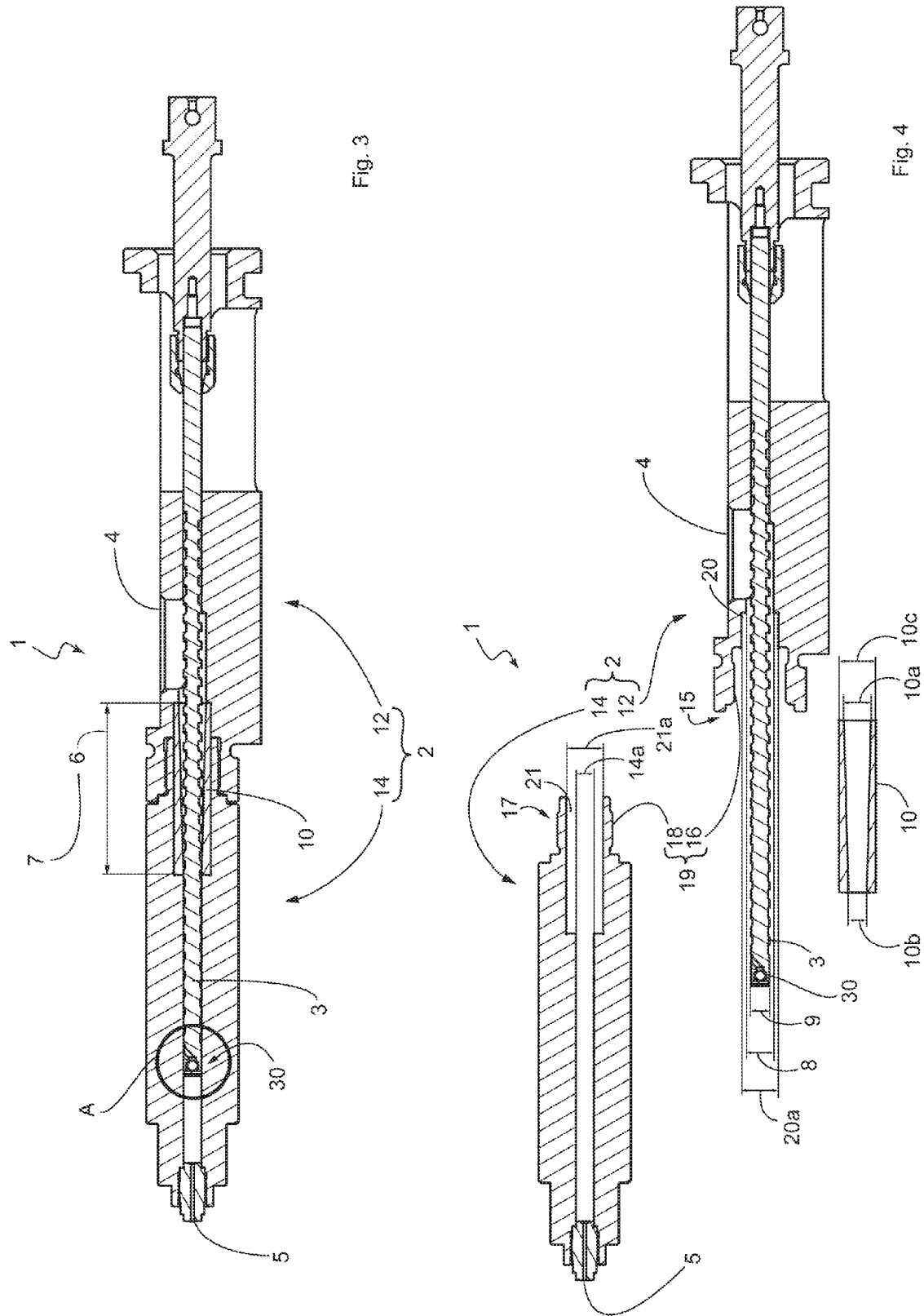

PLASTICIZING UNIT OF AN INJECTION MOLDING MACHINE FOR MICRO-INJECTION MOLDING

The invention relates to a plasticizing unit of an injection molding machine for micro-injection molding having a plasticizing cylinder, which has a feed opening formed in the outer surface thereof for the supply of material to be plasticized and an outlet opening formed on an end face and connectable to a tool of the injection molding machine, and a screw, which conveys the material to be plasticized from the feed opening in the direction of the outlet opening and is accommodated within the plasticizing cylinder, wherein at least one longitudinal section of the plasticizing cylinder between the feed opening and the outlet opening is formed as a transition region in which the inner diameter of the plasticizing cylinder tapers in the direction of the outlet opening to the outer diameter of the screw.

Plasticizing units, in particular plasticizing and injection units, are long known. Usually, a screw is located in a plasticizing cylinder and is initially rotationally driven. By this means and, if necessary, by the application of external heat on the plasticizing cylinder, thermoplastic plastic granulate is plasticized and conveyed into an antechamber of the plasticizing cylinder. The melt collects there until sufficient material has collected. The plastic material present in the antechamber of the plasticizing cylinder is then injected into an injection molding tool by a translational displacement movement of the screw. The screw and the plasticizing cylinder function then as piston and cylinder.

Recently, a need has arisen for producing injection molded parts with particularly small dimensions. In this case, micromechanical components, for example, microgears for micropumps, small medical components, and opto-electrical elements, such as parts for light guides, are to be listed as example components, for which the production causes problems using classical injection molding machines. For such micro-components, the shot weights are approximately 1 g and lower, wherein the shot weight corresponds to the total of the molded part weight and the sprue weight. Working with smaller screw diameters has been attempted to implement such low shot weights, because by this means the dwell time and thus the degradation of the plastic in the plasticizing unit may be kept low. However, when using such classical plasticizing units, as described previously, limits are hit because the helical cavity of the screw must be sufficiently deep in the feed region in order to be able to collect granules. If the helical cavity of the screw in such a plasticizing unit is smaller than the granulate grain diameter, the granules must be initially sheared off at the front edge of the hopper in order to be able to be conveyed further. This leads to pressure shocks and pulsations in the throughput.

To prevent these undesired disadvantages, injection molding machines for micro-injection molding are known from the prior art, in which the screws indeed have the desired small diameter with respect to the small shot weights. However, these screws, which have a diameter of approximately 10 mm, function exclusively for conveying the material, which is plasticized by an additional screw with a substantially larger diameter. The disadvantage in using two screws, of which one functions for plasticizing and the other for conveying the plasticized material, is that a substantially larger volume of molding material or material to be plasticized is melted, which corresponds to approximately ten times the required volume, wherein the dwell time is likewise correspondingly longer.

As a lower limit, plasticizing units with a screw diameter of 10 mm are known. Such a plasticizing unit, which corresponds to the type described at the beginning, is known from the prior art and is described in DE 10 2006 004 899 A1. The plasticizing unit described herein has, however, the disadvantage that the geometric progression of the feed region configured conically in the inner diameter is not adjusted to the behavior of the granulate material drawn in, so that the granulate is neither conveyed cleanly and consistently nor rotated into the helical cavities.

Arising from the known prior art, the underlying object of the invention is to provide a solution which provides an improved plasticizing unit in a structurally simple way, which avoids the known disadvantages and is adjustable to different material behaviors of conventional granulates.

In a plasticizing unit of the type described at the beginning, the problem is solved according to the invention in that the transition region is formed by a sleeve-shaped transition element which is removably and replaceably mounted within the plasticizing cylinder, wherein the plasticizing cylinder is designed as at least two parts for removing and replacing the sleeve-shaped transition element.

Advantageous and appropriate embodiments and refinements of the invention arise from the subclaims.

By means of the invention, a plasticizing unit for micro-injection molding is provided which is characterized by an appropriate structure. In contrast to the known prior art, the transition region according to the invention is variably changeable, which is achieved by the at least two-part design of the plasticizing cylinder. It is thus possible to replace the transition element and to adjust and optimize it to the different materials which are to be conveyed and plasticized. Stated more exactly, it is possible, due to replaceability of the transition element, to adjust the contour of the transition region to the material to be plasticized because different materials behave very differently, in particular in the feed region, which is extremely noticeable specifically during micro-injection molding and the use of small screw diameters. It is therefore possible with the aid of the invention to adapt the transition region, by means of the transition element, to the behavior of the material to be plasticized, by which means pressure shocks and pulsations may be effectively prevented despite the use of a screw with a diameter of less than 10 mm, for example, 8 mm. The replaceable and sleeve-shaped transition element may have different slopes and curves and is correspondingly adapted to the conveying characteristics of the thermoplastic material to be conveyed, by which means an optimal conveying of the material to be plasticized is guaranteed; in contrast, the measure known from the prior art provides a compromise for all granulates because an adjustment to a specific granulate would involve an replacement of the entire plasticizing cylinder in the prior art, which, in contrast, is avoided by the invention, because the entire plasticizing cylinder does not need to be replaced, instead only the sleeve-shaped transition element, in order to optimally configure the conveying behavior to the smallest shot weights. This optimization also further effects in an advantageous way an optimal preparation of the plastic material, an optimal homogenization of the melt, and an optimal mixing (for example in the use of color).

In the configuration of the plasticizing unit, the invention provides that the inner diameter of the plasticizing cylinder is larger in the region of the feed opening than the outer diameter of the screw. This configuration guarantees that the granulate to be plasticized is initially safely fed and conveyed by the screw, wherein the granulate is shapeable by the gradual plasticizing and is conveyable by the smaller screw diameter of 8 mm. In particular, a special granulate with a smaller grain size does not have to be used, but instead standard granulates may be conveyed and plasticized by the plasticizing unit according to the invention.

With respect to the feature that the plasticizing cylinder is formed from at least two parts; there are many potentials for the implementation. It has proven particularly advantageous and appropriate if the plasticizing cylinder is divided into two parts in the axial direction, wherein the plasticizing cylinder comprises at least one first cylinder element and one second cylinder element which are connected to one another via a positive locking connection.

A particularly simple structural potential for the design of a positive locking connection is provided in the configuration of the invention in that the positive locking connection is a threaded connection, via which the first cylinder element and the second cylinder element are screwed to one another.

To define an exactly defined position of the transition region, the invention provides in another embodiment that the first cylinder element is designed with an accommodation space molded in the inner wall thereof at the longitudinal end thereof connected to the second cylinder element and/or the second cylinder element is designed with an accommodation chamber molded in the inner wall thereof at the longitudinal end thereof connected to the first cylinder element, wherein the outer diameter of the transition element corresponds to the inner diameter of the accommodation space and/or to the inner diameter of the accommodation chamber, and wherein the accommodation space and/or the accommodation chamber accommodate(s) the sleeve-shaped transition element at least in sections.

With respect to an inexpensive manufacturing of the plasticizing unit, it is provided according to the invention that the second cylinder element has the outlet opening and the inner diameter of the second cylinder element is constant from the outlet opening up to the sleeve-shaped transition element.

In order to be able to use a screw with a diameter of 8 mm, the invention provides in one configuration that the screw has a constant outer diameter and a backflow barrier is integrated into the point thereof. In this way, the screw may have a short structure in comparison to conventional screws, by which means the plasticizing unit is smaller over all and may thus be manufactured at lesser expense.

According to the invention, it is thereby advantageous if the backflow barrier comprises a ball and a recess formed on an end face and accommodating the ball, wherein the recess is connected to a helical cavity of the screw via a connecting channel guiding the material to be plasticized. Due to the measure of integrating the backflow barrier in the form of a ball accommodated in a recess in the point of the screw, small screw diameters are possible as an internal thread is omitted for fixing, into which thread the backflow barriers known from the prior art are screwed into the end face of the screw. Thus, there is also no risk of tearing the backflow barrier which is definitely possible when using small threads at small screw diameters.

In another configuration of the invention, it is provided that the ball is arranged moveably within the recess between the connecting channel and a retaining element, which runs transverse to the screw longitudinal axis and retains the ball in the recess, in order to either release the throughput of material to be plasticized or to block the throughput of material to be plasticized through the connecting channel into the recess. This configuration of the backflow barrier guarantees a simple and thus cost-optimized manufacturing as an inner thread and a centering set are omitted. In particular, several expensive manufacturing parts for the backflow barrier are omitted in comparison to the prior art.

Finally, it is advantageous in another embodiment of the backflow barrier if the retaining element is removably fixed on the point of the screw and is designed as a pin which is fixed on either side in through holes in the point of the screw.

It is understood that the previously listed and the subsequently to be explained features may be used not only in the respectively indicated combination, but also in other combinations or alone without exceeding the scope of the present invention. The scope of the invention is only defined by the claims.

Additional details, features, and advantages of the subject matter of the invention arise from the subsequent description in connection to the drawing, in which a preferred embodiment of the invention is presented.

FIG. 3 shows a sectional side view of the plasticizing unit according to the present invention;

FIG. 4 shows another sectional side view of the plasticizing unit from FIG. 3, wherein individual components are shown separately;

Figure 1:
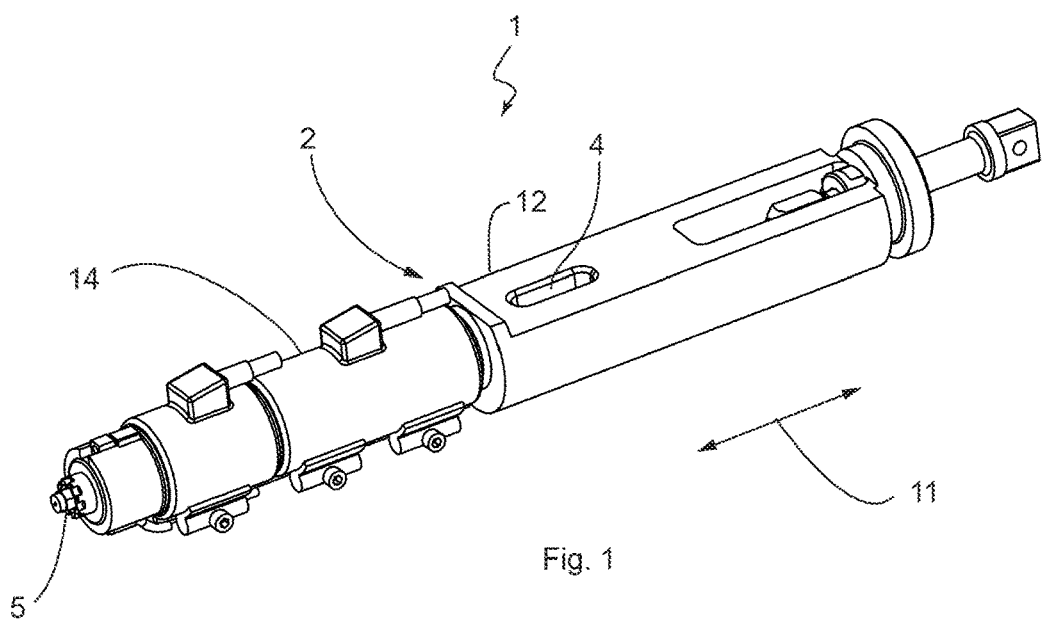
FIG. 1 shows a perspective view of a plasticizing unit according to the invention.
Figure 2:
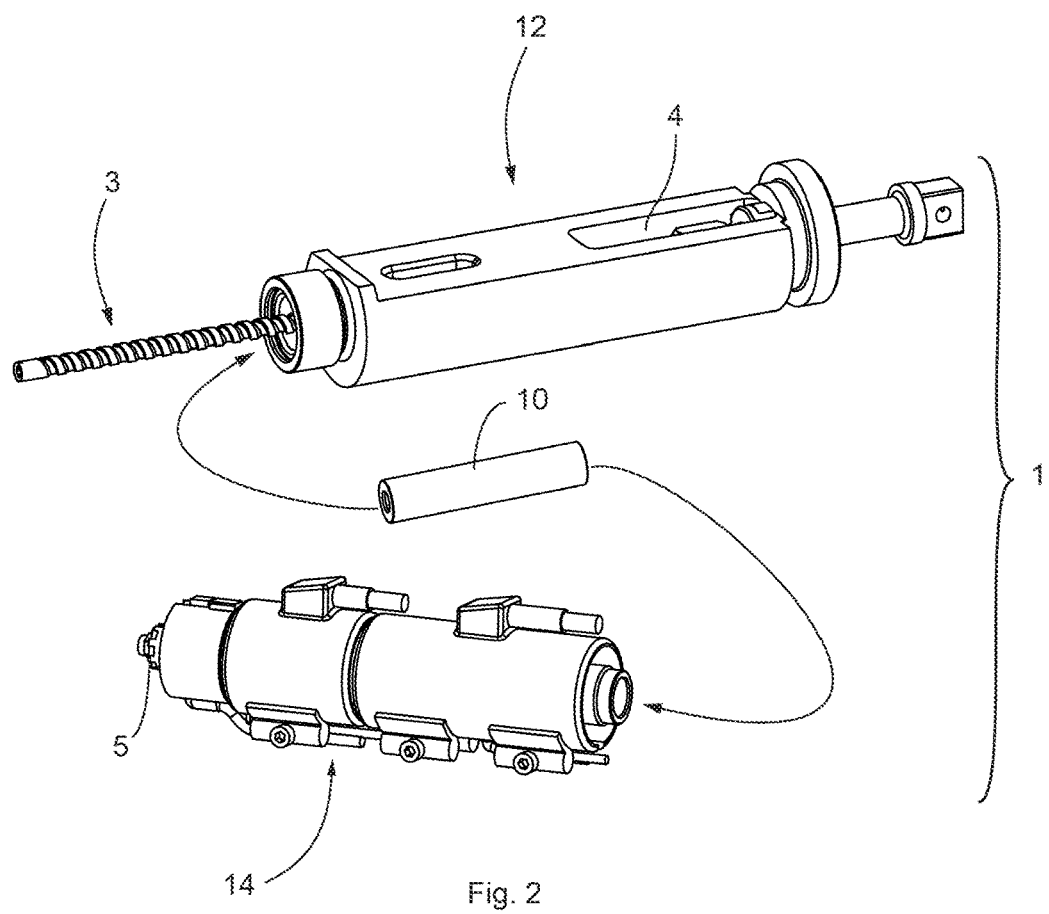
FIG. 2 shows a perspective individual part view of the plasticizing unit shown in FIG. 1.
Figure 5:
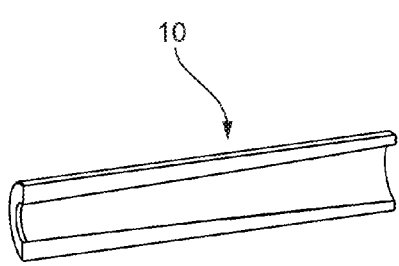
FIG. 5 shows a transition element of the plasticizing unit according to the invention in a perspective sectional view.

FIGS. 1 through 4 show in a schematic way a plasticizing unit 1 according to the invention of an injection molding machine for micro-injection molding; in contrast, FIGS. 5 through 8 present individual details of components of plasticizing unit 1 according to the invention. As is clear from FIGS. 1 through 4, plasticizing unit 1 comprises a plasticizing cylinder 2 and a screw 3 which is accommodated inside of plasticizing cylinder 2. Plasticizing cylinder 2 has a feed opening 4 formed in the outer surface thereof for guiding material to be plasticized and an outlet opening 5 formed at the end face and connectable to a tool (not shown in the figures) of the injection molding machine. Worm 3 hereby conveys the material to be plasticized from feed opening 4 in the direction of outlet opening 5. As FIG. 3 shows, for example, a longitudinal section 6 of plasticizing cylinder 2 between feed opening 4 and outlet opening 5 is formed as a transition region 7. In transition region 7, the inner diameter 8 of plasticizing cylinder 2 tapers in the direction of outlet opening 5 to the outer diameter 9 of the screw, as is also shown in FIG. 4 by way of example.

According to the invention, transition region 7 is formed by a sleeve-shaped transition element 10. Transition element 10 is removably and replaceably mounted, thus transition element 10 may be adapted optimally to the feed characteristics of different plastic materials which are to be processed during micro-injection molding. Transition element 10 is presented in a perspective sectional view of FIG. 5. It is clear that the inner diameter of transition element 10 tapers constantly and smoothly, and indeed from inner diameter 8 in the region of feed opening 4 to outer diameter 9 of screw 3, as is presented in FIG. 4. The inner contour of transition element 10 is thereby optimally adapted in slope and shape to the feed characteristics of the different plastic materials which are to be processed using plasticizing unit 1, for which reason the replaceability of transition element 10 is an important feature by which means plasticizing unit 1 is variably usable for different plastic materials. Plasticizing cylinder 2 is formed in two parts for the removal and the replacement of sleeve-shaped transition element 10. As is clear, for example, from FIGS. 2 and 4, plasticizing cylinder 2 correspondingly comprises a first cylinder element 12 and a second cylinder element 14. Transition element 10 thereby ensures a continuous fluidic transition from first cylinder element 12 to second cylinder element 14. Inner diameter 8 of the plasticizing cylinder is larger in the region of feed opening 4 than outer diameter 9 of screw 3, which is 8 mm. Accordingly, inner diameter 10a of transition element 10 corresponds at the side thereof, which is in fluidic connection with first cylinder element 12, to inner diameter 8 of plasticizing cylinder 10 in the transition region; in contrast, inner diameter 10b of transition element 10 corresponds at the side thereof, which is in fluidic connection with second cylinder element 14, to outer diameter 9 of screw 3. Inner diameter 14a of second cylinder element 14 is constant from outlet opening 5 up to sleeve-shaped transition element 10.

For the second embodiment of plasticizing cylinder 2, a fixed and secure connection of both cylinder elements 12, 14 with respect to operating safety is of great importance. Correspondingly, the invention provides that first cylinder element 12 and second cylinder element 14 are connected to one another via a positive locking connection 19. For this purposes, longitudinal end 15 of first cylinder element 12, connected to second cylinder element 14, is provided with an inner thread 16. Correspondingly, longitudinal end 17 of second cylinder element 14, connected to first cylinder element 12, has an outer thread 18, which engages with inner thread 16 of first cylinder element 12 so that positive locking connection 19 is a threaded connection. First cylinder element 12 and second cylinder element 14, which has outlet opening 5, are screwed to one another via the threaded connection.

To incorporate transition element 10, corresponding recesses are provided in the longitudinal ends 15, 17 of both cylinder elements 12, 14 in the embodiment shown in the figures. With regard to this, first cylinder element 12 is formed with an accommodation space 20 shaped in the inner wall of first cylinder element at longitudinal end 15 connected to second cylinder element 14; in contrast, second cylinder element 14 is formed with an accommodation chamber 21 shaped in the inner wall of second cylinder element at longitudinal end 17 connected to first cylinder element 12. A configuration is also conceivable in an alternative embodiment in which only first cylinder element 12 accommodates transition element 10 in accommodation space 20, or only second cylinder element 14 accommodates transition element 10 in accommodation chamber 21. Corresponding to the embodiment shown in the figures, outer diameter 10c of transition element 10 corresponds to inner diameter 20a of accommodation space 20 and inner diameter 21a of accommodation chamber 21. As the embodiment in FIGS. 3 and 4 shows, accommodation space 20 and accommodation chamber 21 accommodate sleeve-shaped transition element 10 in sections.

Figure 6:
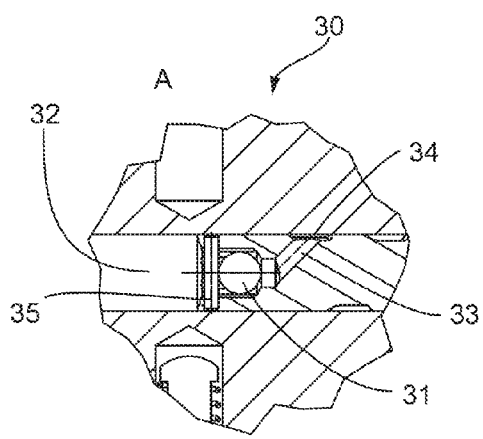
FIG. 6 shows a magnified view of a detail section A known from FIG. 3.
Figure 7:
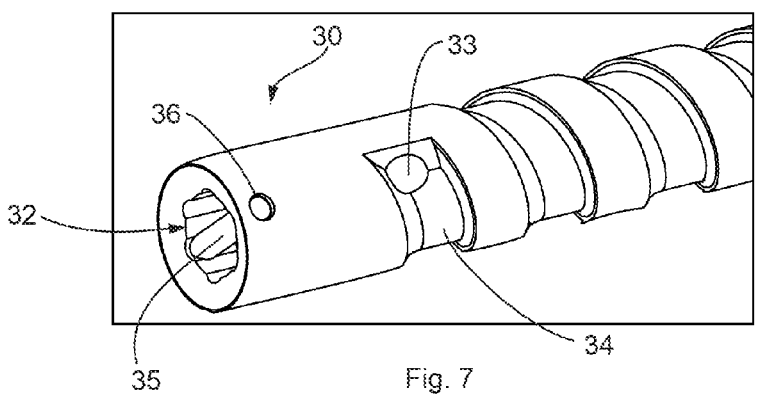
FIG. 7 shows a magnified view of a point of a screw of the plasticizing unit according to the invention in a perspective view.
Figure 8:
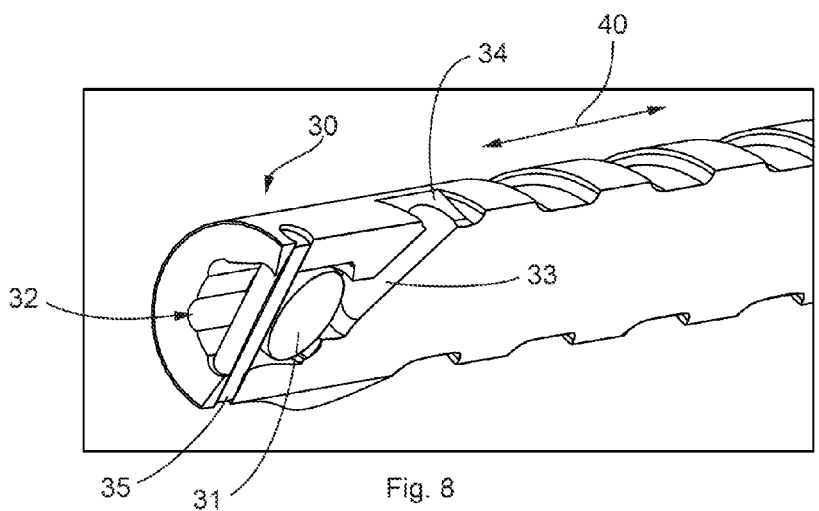
FIG. 8 shows another magnified view of a point of a screw of the plasticizing unit according to the invention in a perspective sectional view.

In addition to the two-part structure of plasticizing cylinder 2, wherein this may consist of more than two parts, a particular structure for a backflow barrier is advantageous for micro-injection molding using a screw with an outer diameter smaller than or equal to 8 mm, which will be subsequently explained. As FIG. 4 shows, screw 3 has a constant outer diameter 9. In addition, a backflow barrier 30 is integrated into the point of screw 3, the details of which are shown in FIGS. 6 through 8, to which reference will be subsequently made. FIG. 6 thereby shows a magnified view of a detail A from FIG. 3. Backflow barrier 30 comprises a ball 31 and a recess 32 in which ball 31 is movably arranged. Recess 32 is itself connected to a helical cavity 34 of screw 3 via a connecting channel 33. The material to be plasticized in helical cavity 34 arrives via connecting channel 33 into recess 32, from where it is then injected into the tool via outlet opening 5. To prevent a return flow of the plasticized material, ball 31 is provided, which is accommodated movably in recess 32 and which blocks connecting channel 33 and thus may prevent a return flow. Ball 31 is thereby arranged movably within recess 32 between connecting channel 33 and a retaining element 35, which extends transverse to longitudinal axis 40 of the screw and retains ball in recess 32 in order to correspondingly release the throughput of plasticized material or to block the throughput of plasticized material through connecting channel 33 into recess 32. Retaining element 35 is removably fixable at the point of screw 3 and is designed as a pin which is fixed on either side in through holes 36 in the point of screw 3.

In summary, a plasticizing unit 1 of an injection molding machine for micro-injection has been previously described, in which the diameter of screw 3 is at most 8 mm and the thermoplastic processing takes place using standard granulate. The special features of plasticizing unit 1 are that a screw having a diameter of 8 mm may be used, backflow barrier 30 is integrated directly in screw 3 as a ball-backflow barrier, and a conical transition in the feed region of the screw is provided as a replaceable sleeve or transition element 10 with, if necessary, different slopes and also potential roundable transitions for adapting the transition region to feed region 4 in the conveying zone to the conveying characteristics of the different thermoplastic materials. To replace the conical sleeve or transition element 10, plasticizing cylinder 2 is formed as divided. Plasticizing unit 1 according to the invention allows for the use of standard granulates. Consequently, specialized micro-granulates may be omitted by the invention. For this purpose, the inner diameter of plasticizing cylinder 2 is increased in the region of the feed or of feed opening 4 with respect to the diameter of screw 3 and is brought to the screw diameter via the shaped sleeve or transition element 10. Due to the replaceable sleeve or due to replaceable transition element 10, the transition contour may be optimally adapted in slope and shape to the feed characteristics of the different plastic materials. The manufacturability is achieved by the partition of the cylinder, which furthermore simplifies the manufacturability of the components on the basis of lower bore lengths and good accessibility of the machining points. In addition, it is clear from the figures that a divided screw 3 is used with a clamping sleeve connection to adapt to a "standard injection unit". The described plasticizing cylinder 2 may, due to the configuration thereof with transition element 10, accept large granulate grains, such that a reciprocating screw plasticizing unit or screw/piston plasticizing unit (thus for screws which have an antechamber and execute a translational movement) may be used for micro-injection molding.

The previously described invention is naturally not limited to the described and shown embodiment. It is obvious that numerous alterations, obvious to the person skilled in the art and corresponding to the intended application, may be carried out on the embodiment shown in the drawing without leaving the area of the invention. The invention includes all those aspects contained in the description and/or presented in the drawings, including that which is obvious for a person skilled in the art and deviates from the specific embodiment.

The invention claimed is:

1. A plasticizing unit of an injection molding machine for micro-injection molding comprising:
    a plasticizing cylinder, which has a feed opening formed in the outer surface thereof for supply of material to be plasticized and an outlet opening formed on an end face and connectable to a tool of the injection molding machine, and
    a screw, which conveys the material to be plasticized from the feed opening in a direction toward the outlet opening and is accommodated within the plasticizing cylinder,
    wherein at least one longitudinal section of the plasticizing cylinder between the feed opening and the outlet opening is formed as a transition region in which an inner diameter of the plasticizing cylinder tapers in the direction toward the outlet opening to an outer diameter of the screw,
    wherein the transition region is formed by a sleeve-shaped transition element which is removably and replaceably mounted within the plasticizing cylinder, wherein the plasticizing cylinder is designed as at least two parts for removing and replacing the sleeve-shaped transition element,
    wherein the plasticizing cylinder is divided into at least two parts in an axial direction, wherein the plasticizing cylinder comprises at least one first cylinder element and one second cylinder element which are connected to one another via a positive locking connection,
    wherein the first cylinder element includes a first accommodation space molded in an inner wall of the first cylinder element at a longitudinal end of the first cylinder element connected to the second cylinder element and/or the second cylinder element includes a second accommodation chamber molded in an inner wall of the second cylinder element at a longitudinal end of the second cylinder element connected to the first cylinder element,
    wherein an outer diameter of the transition element corresponds to an inner diameter of the first accommodation space and/or to an inner diameter of the second accommodation chamber, and
    wherein the first accommodation space and/or the second accommodation chamber accommodates the sleeve-shaped transition element at least in sections.

2. The plasticizing unit according to claim 1, wherein the inner diameter of the plasticizing cylinder is larger in a region of the feed opening than the outer diameter of the screw.

3. The plasticizing unit according to claim 1, wherein the positive locking connection is a threaded connection, via which the first cylinder element and the second cylinder element are screwed to one another.

4. The plasticizing unit according to claim 1, wherein the second cylinder element has the outlet opening and an inner diameter of the second cylinder element is constant from the outlet opening up to the sleeve-shaped transition element.

5. The plasticizing unit according to claim 1, wherein the screw has a constant outer diameter, wherein a backflow barrier is integrated into a tip of the screw.

6. The plasticizing unit according to claim 5, wherein the backflow barrier comprises a ball and a recess formed on an end face and accommodating the ball, wherein the recess is connected to a helical cavity of the screw via a connecting channel guiding the material to be plasticized.

7. The plasticizing unit according to claim 6, wherein the ball is arranged moveably within the recess between the connecting channel and a retaining element, which runs transverse to a screw longitudinal axis and retains the ball in the recess.

8. The plasticizing unit according to claim 7, wherein the backflow barrier is removably fixed on the tip of the screw and is a pin which is fixed on either side in through holes in the tip of the screw.

9. The plasticizing unit according to claim 1, wherein the sleeve-shaped transition element is axially fixed with respect to the plasticizing cylinder when accommodated in the first transition space and/or the second accommodation chamber and the first cylinder element and the second cylinder element are connected to one another via the positive locking connection.

10. The plasticizing unit according to claim 1, wherein the sleeve-shaped transition element comprises a tapered inner diameter.

11. A plasticizing unit of an injection molding machine for micro-injection molding comprising:
    a plasticizing cylinder, which has a feed opening formed in the outer surface thereof for supply of material to be plasticized and an outlet opening formed on an end face and connectable to a tool of the injection molding machine, and
    a screw, which conveys the material to be plasticized from the feed opening in a direction toward the outlet opening and is accommodated within the plasticizing cylinder,
    wherein at least one longitudinal section of the plasticizing cylinder between the feed opening and the outlet opening is formed as a transition region in which an inner diameter of the plasticizing cylinder tapers in the direction toward the outlet opening to an outer diameter of the screw,
    wherein the transition region is formed by a sleeve-shaped transition element which is removably and replaceably mounted within the plasticizing cylinder, wherein the plasticizing cylinder is designed as at least two parts for removing and replacing the sleeve-shaped transition element,
    wherein the screw has a constant outer diameter, wherein a backflow barrier is integrated into a tip of the screw,
    wherein the backflow barrier comprises a ball and a recess formed on an end face and accommodating the ball, wherein the recess is connected to a helical cavity of the screw via a connecting channel guiding the material to be plasticized.

12. The plasticizing unit according to claim 11, wherein the ball is arranged moveably within the recess between the connecting channel and a retaining element, which runs transverse to a screw longitudinal axis and retains the ball in the recess.

13. The plasticizing unit according to claim 12, wherein the backflow barrier is removably fixed on the tip of the screw and is a pin which is fixed on either side in through holes in the tip of the screw.

* * * * *